United States Patent [19]
Yorke et al.

[11] 3,733,092
[45] May 15, 1973

[54] CONDUIT RESTRAINING AND SEALING CONNECTOR

[75] Inventors: Roy E. Yorke, Granada Hills; Stephen N. Affa, Torrance, both of Calif.

[73] Assignee: General Connectors Corporation, Burbank, Calif.

[22] Filed: Oct. 29, 1970

[21] Appl. No.: 84,973

[52] U.S. Cl. .................. 285/166, 285/261, 285/373
[51] Int. Cl. ............................................. F16l 27/04
[58] Field of Search ................... 285/233, 234, 373, 285/419, 166, 369, 261

[56] References Cited

UNITED STATES PATENTS

| | | | |
|---|---|---|---|
| 2,852,282 | 9/1958 | Smisko et al. | 285/166 X |
| 2,417,250 | 3/1947 | Harvey | 285/164 |
| 2,556,659 | 6/1951 | Patterson | 285/261 X |
| 3,052,491 | 9/1962 | Grass | 285/233 |
| 3,540,758 | 3/1970 | Torres | 285/233 |
| 2,793,883 | 5/1957 | Main | 285/369 X |

FOREIGN PATENTS OR APPLICATIONS 6,708,477  12/1967  Netherlands .................... 285/233

*Primary Examiner*—Dave W. Arola
*Attorney*—Lyon & Lyon

[57] ABSTRACT

A restraining means including a pair of journal rings secured to a pair of confronting conduits and having spherical outer surfaces, and a connecting shell having mating end portions to permit limited relative movement of the conduits; the connecting shell being longitudinally split into hinge connected complementary parts and one hinge being separable. The housing encloses a seal connector also joining the conduits and permitting limited relative movement. The housing is provided with internal stop flanges which limit axial movement of the seal connector.

4 Claims, 5 Drawing Figures

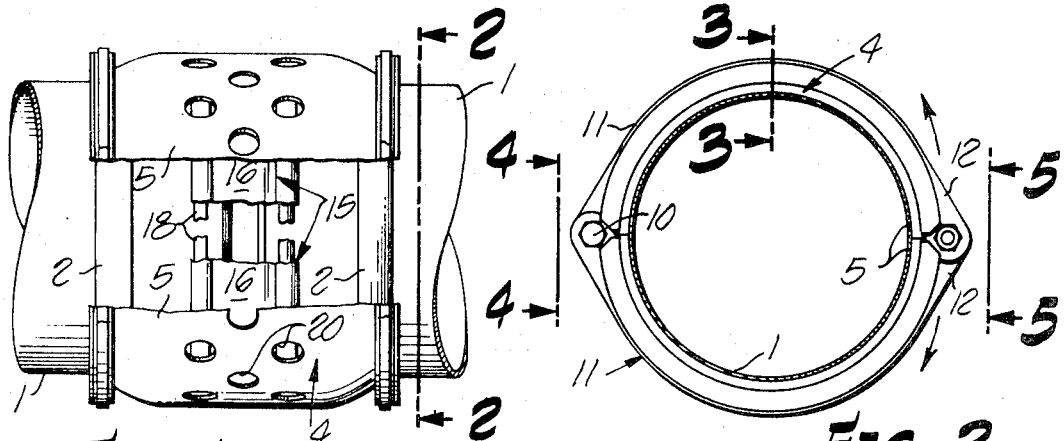
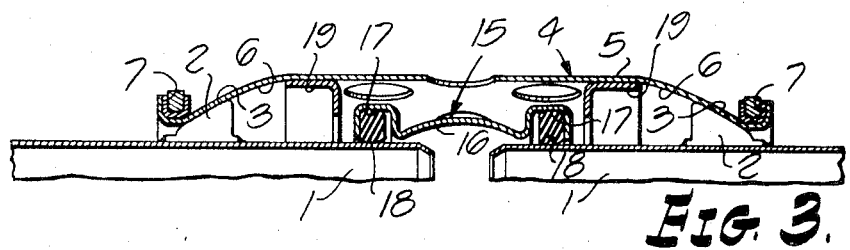
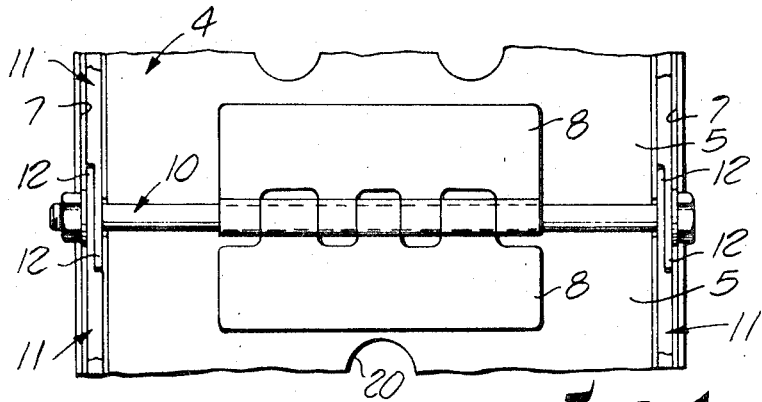
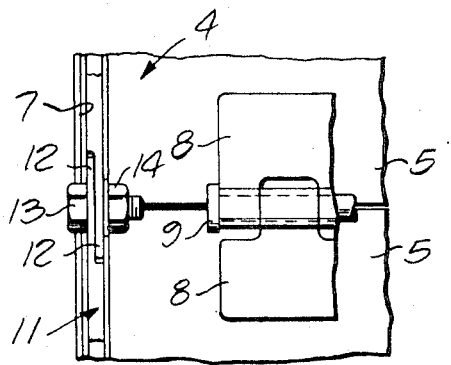
Roy E. Yorke
Stephen N. Affa
INVENTORS
BY Lyon Lyon
ATTORNEYS

CONDUIT RESTRAINING AND SEALING CONNECTOR

BACKGROUND OF THE INVENTION

Conduits, particularly those used in aircraft, have been joined by sealing connectors such as the type shown in U.S. Pat. No. 3,206,229. In most cases the conduits are supported in such a manner that their relative portions, whether angular, offset or coaxial, are fixed, or substantially so, and are within the range of adjustment of the sealing connector. Previously, in such cases as required a mechanical connection between the conduits the forces involved were sufficiently low that a pair of flanges connected by wire links were sufficient as shown in the above-identified patent. As the size and complexity of aircraft has increased, the previous means of providing mechanical connection between conduits has been inadequate, resulting in the need of fixed partitions or other costly and heavy means to anchor and restrain the conduits.

SUMMARY OF THE INVENTION

The present invention is directed to conduit restraining and sealing connectors which is summarized in the following objects:

First, to provide a conduit restraining and sealing connector wherein a restrainer secures a pair of conduits in essentially predetermined spaced relation while permitting a limited degree of relative angular or, offset motion, and which covers and protects a sealing connector joining the conduits.

Second, to provide a conduit restraining which includes journal rings secured to each conduit and having an essentially spherical surface, and a connecting housing having mating ends portions, the housing being capable of ready removal to provide access to an underlying seal connector.

Third, to provide a conduit restraining and seal connector as indicated in the preceding objects wherein the restrainer includes internal stop flanges to prevent excessive movement of the seal connector; whereas, on removal of the housing, the seal connector may be transferred laterally in either direction so that each seal may be removed and replaced by a new seal without displacement of the conduits.

DESCRIPTION OF THE DRAWINGS

FIG. 1 is a side view of a conduit restraining and sealing connector with portions broken away to expose internal construction.

FIG. 2 is a sectional view along 2—2 of FIG. 1 showing the connector in elevation.

FIG. 3 is an enlarged fragmentary sectional view taken to 3—3 of FIG. 2.

FIG. 4 is an enlarged fragmentary side view taken from 4—4 of FIG. 2.

FIG. 5 is an enlarged fragmentary elevational view taken from 5—5 of FIG. 2.

SPECIFICATION

The conduit restraining and sealing connector is intended primarily to connect a pair of conduits 1, utilized in an air craft. However, the connector is not limited thereto. Each conduit receives a journal ring 2 having a cylindrical side which is welded or otherwise permanently attached to the conduit. The outer surface of each internal ring is spherical as indicated by 3.

The conduits 1 are disposed in confronting end relation and are enclosed in a housing structure indicated generally by 4. The housing structure includes a pair of complementary half shells, or semi-cylindrical housing members 5. The remote ends of the housing members form spherical end portions 6 which conform to the spherical surfaces 3 of the journal rings 2. Additionally, the end portions are provided with reinforcing channels 7.

The two housing members 5 are joined at their midportions by hinge components 8. One pair of hinge components receives a fixed hinge pin 9, whereas the other pair of hinge components receives a removable hinge pin or bolt 10.

The channel 7 of each half shell or housing member 5 receives a semi-circular reinforcing ring segment 11 having radially enlarged and axially reduced ends 12 which are perforated and circumferentially overlap the ends of the companion ring 6. The ends 12 are perforated. The pairs of ends axially aligned with the removable bolt 10 receive the extremities thereof, as shown in FIG. 4; whereas, the opposite overlapped ends are joined by bolts 13, having nuts 14, as shown in FIG. 5.

The conduits 1 are also connected by a sealing connector 15 which includes a connector shell 16, having internal channels 17 at its extremities which receive seal rings 18.

The seal rings 18 engage the conduit 1. To limit axial movement of the sealing connector 15, with respect to the conduits, so as to ensure that the sealing connector does not slip endwise off of one of the conduits, the housing members 5 are provided with complementary internal retaining flanges 19 which radially overlap the ends of the sealing connector 15, as shown best in FIG. 3.

If the conduits transport a heated fluid, it is desirable to provide perforations 20 in the housing members 5, as indicated in FIGS. 1 and 3.

The conduits restraining and sealing connector operates as follows:

Installation is accomplished by first fitting the sealing connector 15 onto the conduits. This is accomplished by placing the connector 15 on one of the conduits, while it is separated a sufficient distance either laterally or axially from the other conduit, then the other conduit is brought into position and the connector mounted, as shown in FIGS. 1 and 3.

The two housing members and their respective reinforcing ring segments are folded about the common axis of the bolts 13 and fixed hinge pin 9 with the end portions 6 in registry with the journal rings 2 until the hinge pin or bolt 10 may be slipped through the enlarged ends 12 of the ring segments and the mating portions of the separable hinge components 8.

Upon being assembled onto the conduits, the housing permits limited relative pivotal movement of the conduits and the sealing connector 15 likewise permits such movement. Some axial movement of the sealing connector with respect to the conduits is permitted, but this movement is limited by the flanges 19.

While a particular embodiment of this invention has been shown and described, it is not intended to limit the same to the details of the construction set forth, but instead, the invention embraces such changes, modifications and equivalents of the various parts and their relationships as come within the purview of the appended claims.

We claim:
1. A restraining and sealing connector for conduits disposed in confronting relation to each other, the connector comprising:
   a. A sealing connector including a band bridging between the conduits, and sealing means disposed between the band and each conduit and sealingly engaging the band and conduits;
   b. an annular housing means overlying and clearing the sealing connector and including a pair of complementary semicircular housing members divided longitudinally and having circumferential channels at their axial extremities;
   c. a pair of semicircular reinforcing band elements received in the channels;
   d. a pair of hinge means joing the housing members and band elements, at least one of the hinge means being common to the housing members and band elements and being separable to permit removal of the housing from the conduits to expose the sealing connector;
   e. and a pair of universal joints each including a band secured to a corresponding conduit and having a spherical surface, and a journal portion at each end of the housing means mating with said sperical surface.

2. A connector for conduits as defined in claim 1, wherein:
   a. stops fixed on said housing, spaced a greater axial distance than the axial length of the sealing connector, and extending radially inward from the housing means to limit axial displacement of the sealing connector.

3. The combination with a pair of conduits disposed in confronting relation and a sealing connector bridging between and sealingly joining the conduits, of a restraining means for limiting relative movement between the conduits, the restraining means comprising:
   a. a pair of complementary semicircular housing members of essentially uniform wall thickness, the housing members having a central cylindrical portion clearing the sealing connector and merging at each axial extremity into a spherical segment curving toward a corresponding conduit;
   b. a band mounted on each conduit having a spherical portion mating with a corresponding spherical segment of the housing members;
   c. a set of axially aligned hinge means joining the housing members to permit movement of the housing members between their complementary position enclosing the sealing connector and an open position for removal from the conduits and sealing connector;
   d. separable means for securing the housing members in their closed position;
   e. and a pair of stops fixed in said housing spaced a greater distance axially than the axial extent of the sealing connector and extending radially inwardly from the housing members to limit axial movement of the sealing connector relative to the conduits.

4. The combination with a pair of conduits disposed in confronting relation, each conduit having a journal ring forming an outwardly directed spherical segment; and a sealing connector bridging between and sealingly joining the conduits, of a restraining means for limiting relative movement between the conduits, the restraining means comprising:
   a. a pair of complementary semicurcular housing members of essentially uniform wall thickness, the housing members having a central cylindrical portion clearing the sealing connector and merging at each axial extremity into a spherical segment portions mating with a corresponding journal rings to permit limited universal movement, each spherical segment portion terminating in a pair of axially spaced radially outwardly directed reinforcing flanges forming an annular channel;
   b. a set of axially aligned hinge means joining the housing members and including a separable hinge means to permit movement of the housing members between their complementary position enclosing the sealing connector and an open position for removal from the conduits and sealing means;
   c. and a pair of complementary relatively rigid reinforcing bands fitting each annular reinforcing channel and separably hinged along axes corresponding to the housing member hinge means.

* * * * *